(12) United States Patent
Beery et al.

(10) Patent No.: US 8,662,018 B2
(45) Date of Patent: Mar. 4, 2014

(54) BIRDHOUSE OR NEST BOX

(76) Inventors: Marion L. Beery, Henderson, NV (US);
Jack Beery, Henderson, NV (US)

( * ) Notice: Subject to any disclaimer, the term of this patent is extended or adjusted under 35 U.S.C. 154(b) by 546 days.

(21) Appl. No.: 12/837,577

(22) Filed: Jul. 16, 2010

(65) Prior Publication Data

US 2012/0012066 A1 Jan. 19, 2012

(51) Int. Cl.
*A01K 31/14* (2006.01)

(52) U.S. Cl.
USPC .......................................... 119/432; 119/463

(58) Field of Classification Search
USPC ......... 119/428, 429, 431, 432, 433, 434, 435, 119/459, 461, 462, 463, 464, 473, 474, 475, 119/480, 479; D30/110; 220/810, 811
See application file for complete search history.

(56) References Cited

U.S. PATENT DOCUMENTS

| 1,662,687 | A | * | 3/1928 | Tullis | 119/463 |
| 1,885,359 | A | * | 11/1932 | Kroczek | 119/463 |
| 2,219,297 | A | * | 10/1940 | Copeman | 119/431 |
| 2,312,551 | A | * | 3/1943 | Hoskins | 119/432 |
| 4,442,793 | A | * | 4/1984 | Overpeck et al. | 119/432 |
| 6,397,779 | B1 | * | 6/2002 | Bonne | 119/51.01 |
| 7,971,554 | B1 | * | 7/2011 | Diaz | 119/429 |

* cited by examiner

*Primary Examiner* — T. Nguyen
(74) *Attorney, Agent, or Firm* — Oakwood Law Group, LLP; Yuchien Wei; Jie Tan

(57) ABSTRACT

A Easy-To-Clean birdhouse that can be mounted at or above a person's reach includes a plurality of walls one of which is a front wall. The front wall includes an access hole for a bird and a tool-hole opening which extends from an inside surface to an outside surface of the front wall. A hinged floor having a top surface, a bottom surface, a rear end and a front end is pivotly attached about its rear end to two walls of the housing, the front end abuts the inside surface of the front wall, and the top surface is located below the top of the tool-hole opening in the front wall. Whereby, when a tool is inserted into the tool-hole and moved down, it will contact the top surface of the hinged floor and urge the hinged floor to swing down from a horizontal position to a vertical position.

5 Claims, 9 Drawing Sheets

BIRDHOUSE OR NEST BOX

BACKGROUND OF THE INVENTION

1. Field of the Invention

The present invention relates generally to an easier to install birdhouse. Specifically, birdhouses which are mounted to a tree, pole or structure at a height of up to twenty feet or more above the ground that can be cleaned of an old nest from the ground without lowering the birdhouse to the ground, climbing a ladder to reach the birdhouse or removing a part. To allow a young bird to reach the entrance-hole, a ladder having horizontally positioned downwardly angled groove steps are located on each side of the front wall. To allow the birdhouse to be easily installed above the ground, a large sized clearance hole of three eights of an inch, more or less, is located in the upper mounting of the bird house. This opening allows the person installing the birdhouse to position a nail or a screw to a pole, tree or structure on where the birdhouse is to be located. The birdhouse is then hung at the designated location where it can then be leveled before permanent mounting screws or nails are put in place.

2. Description of Related Art

Previous to this invention, several attempts were made to achieve a low cost assembly in a single chamber birdhouse. However, you had to remove parts; this meant the parts could be lost or broken. An example of this technology is the Overpeck et al. patent, EASY-TO-CLEAN BIRDHOUSE, U.S. Pat. No. 4,442,793. It can be seen that the loss of a part or a broken part could entail considerable cost and time to replace.

Another example is the Killmon patent, SELF-CLEANING BIRDHOUSE, U.S. Pat. No. 3,592,169. This patent uses drawers that slide out carrying the old nest which then will drop to the ground. Of course, this technology is neither low cost nor effective because with the drawers out, the floor cannot be disinfected.

Other designs all seem to have the disadvantage of removable parts such as the Bellington patent, PREFABRICATED BIRD HOUSE, U.S. Pat. No. 6,397,781 B1. Another example of a birdhouse with removable parts is the Cuddy patent, METAL/WOOD BIRDHOUSE KIT CONSTRUCTION, U.S. Pat. No. 5,186,123.

Interesting techniques for cleaning multiple cavity birdhouses also exist. An example of this is the Killmon patent, SELF-CLEANING BIRDHOUSE, U.S. Pat. No. 4,140,081. While interesting, it is neither low cost nor reliable and does not lend itself to single cavity birdhouses.

Other examples of birdhouses which permit the removal of an old nest is known in the prior art. More specifically, by way of example, U.S. Pat. No. 5,186,123 to Cuddy discloses a knockdown flat sheet metal component birdhouse having slidable flanged edge assembly connections and flat wood panel interior liners. The assembly connections include U-shaped folded 180 degree flanges extending in the plane of sheet metal panels slidably engaging mating 90 degree flanges on adjacent panels to provide an integrated self-supporting box construction free of fastening means.

U.S. Pat. No. 3,986,480 to Vail discloses a locking device for releasably securing a birdhouse upon its mounting pole. A plate is biased into a locking position at an angle relative to the axis of the post. A pivotal bracket is operable on the plate to bias the plate to a horizontal release position normal to the axis of the post. A lanyard secured to the bottom of the birdhouse is passed up the pole around a pulley wheel at the top thereof and returned down the pole through the bracket. A free end of the lanyard extends below a bracket. Pivoting of the bracket and release of the locking plate is accomplished by pulling on the free end of the lanyard at an angle relative to the post to move the locking plate to its release position.

U.S. Pat. No. 3,426,732 to Wade discloses a birdhouse which includes a hinged door for providing access to the nesting compartments of the birdhouse, and latch means for releasably securing the door in the close condition. The latch means has a leaf spring where one end is secured to the floor of the birdhouse and includes a camming portion and a U shaped channel which is adapted to receive the bottom door edge when it is closed.

U.S. Pat. No. 3,111,934 to Vail discloses a multi apartment birdhouse where each compartment has a clean out door in a side wall. A catch for each door is released by depressing the floor which allows the front wall to be swung outwardly by inserting a finger in the entrance opening to expose the interior of the compartment.

U.S. Pat. No. 3,566,842 to Oldaker discloses a birdhouse having a wooden enclosure with a removable sheet metal roof to provide access to the interior of the birdhouse to place an empty tin can therein. The tin can has an open end which is aligned with a small opening in one end of the enclosure and can be readily replaceable with a fresh tin can after a season of use by birds.

SUMMARY OF THE INVENTION

Regardless of size or configuration, bird nesting structures must periodically be maintained and inspected. Old nests should be discarded. The structure must be cleansed of insects or other parasites that may accumulate in the decomposing organic matter forming the nest. Debris and bird droppings must be removed. Organizations and government agencies often install nest boxes (birdhouses) to attract certain species of birds. Maintaining these birdhouses often falls to volunteers. There are restrictions put on volunteers working on public lands. Often they are not permitted to use ladders because they do not have the proper training. With this birdhouse design, no ladder is required even for birdhouses mounted 10 ft. to 20 ft. in the air where many birds such as the tufted titmouse and nuthatches like to nest.

In an exemplary embodiment of the present invention, there is disclosed an Easy-To-Clean birdhouse having a plurality of walls one of which is a front wall. The front wall includes an entrance-hole for a bird and a tool-hole opening which extends from an outside surface of the front wall to an inside surface. This forms a cavity, or pocket, for the "tool-hole" opening tool. By having a cavity, rather than a through hole, the tool cannot reach through to the nest within the birdhouse. A hinged floor having a top surface, a bottom surface, a rear end and a front end is pivotly attached at its rear end to two walls of the housing. The front end of the hinged floor abuts the inside surface of the front wall, and the top surface is located below the top of the tool-hole opening in the front wall. When a tool is inserted into the tool-hole and moved down, it will contact the top surface of the hinged floor and urge the hinged floor to swing down from a horizontal position to a vertical position.

The more important features of the invention have thus been outlined in order that the more detailed description that follows may be better understood and in order that the present contribution to the art may better be appreciated. Additional features of the invention will be described hereinafter and will form the subject matter of the claims that follow.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest form.

BRIEF DESCRIPTION OF THE DRAWINGS

Other aspects, features, and advantages of the present invention will become more fully apparent from the following detailed description, the appended claim, and the accompanying drawings in which similar elements are given similar reference numerals.

DESCRIPTION OF THE PREFERRED EMBODIMENT

Figure 1:
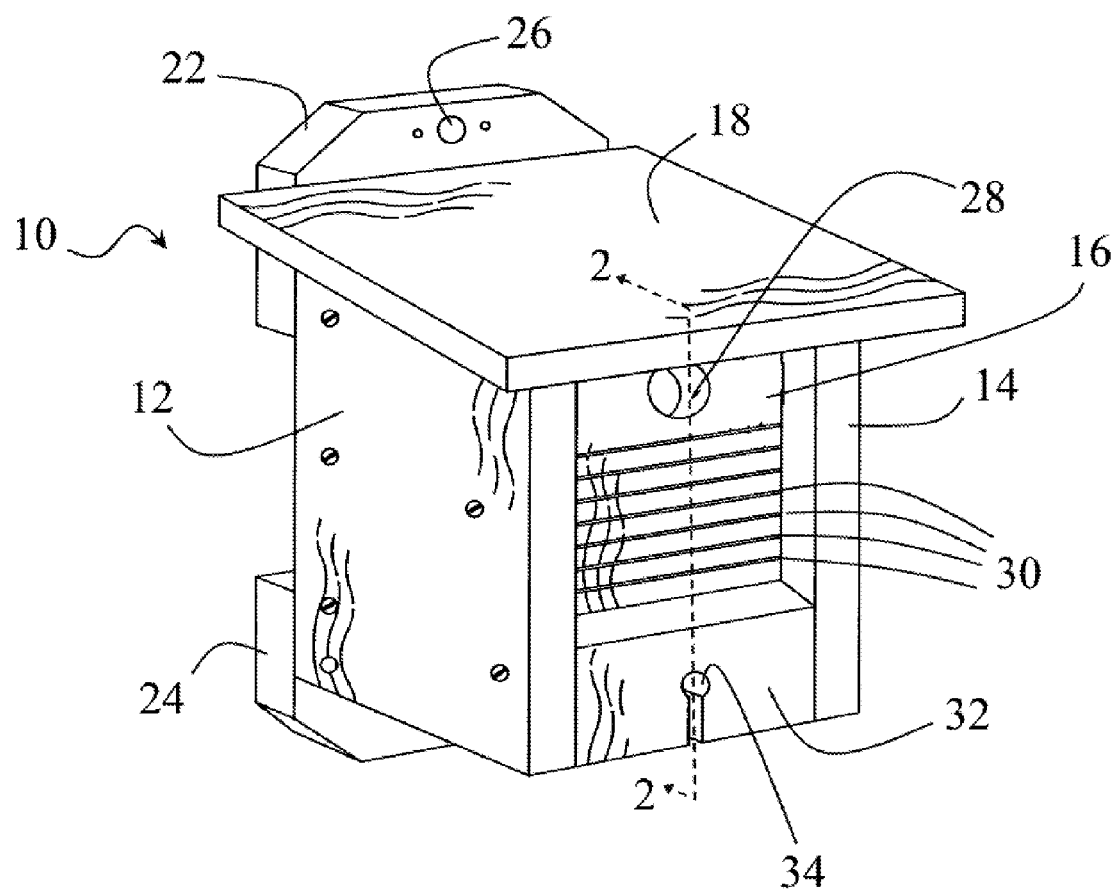
FIG. 1 is a perspective view of an easy to clean and sanitize birdhouse showing the entrance-hole near the top of the front wall of the birdhouse for a bird to enter, a tool-hole opening for receiving a tool which is used to open a hinged floor of the birdhouse from the ground by pulling down on the tool when opening the birdhouse, and a ladder of angled horizontal grooves located between the entrance-hole and the floor of the birdhouse.
Figure 2:
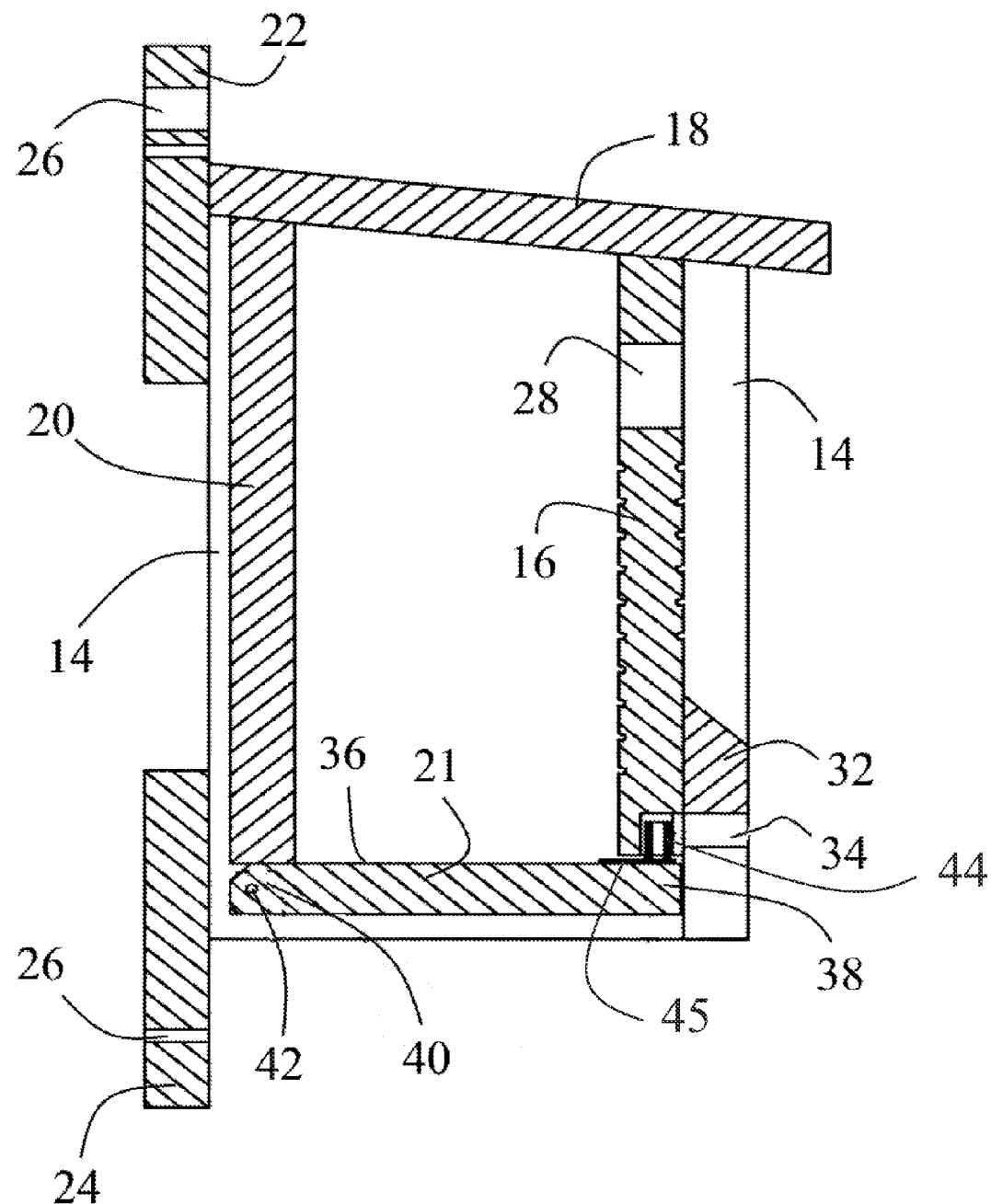
FIG. 2 is a sectional view taken along the line 2-2 of FIG. 1 showing the ladder of angled horizontal grooves located on each side of the front wall of the birdhouse and a magnetic catch and strike plate arrangement for releasably holding the hinged floor closed.

Referring to FIG. 1, there is shown a perspective view of an easy to clean sanitary birdhouse having an entrance-hole near the top of the front wall of the birdhouse for a bird to enter and leave, a tool-hole opening for receiving a tool which is used to open the hinged floor of the birdhouse by pulling down on the tool when the birdhouse is to be cleaned or opened, and a ladder of angled horizontal grooves 30 for the young birds to climb is located between the entrance-hole 28 near the top of the front wall and the hinged floor 21 (see FIG. 2). The birdhouse 10 has two parallel side walls 12, 14, a front wall 16 that is recessed back from the front edges of the side walls, an overhanging roof 18, a rear wall 20 (see FIG. 2), a hinged floor 21 (see FIG. 2), an upper mounting member 22 and a lower mounting member 24 attached to the rear wall 20 with screws, nails and/or an adhesive such as an epoxy.

The upper and lower mounting plates are separate from the rear wall 20 (see FIG. 2). This feature allows the unit to be packaged for display and shipment without the mounting plates being installed. Then the end user installs these mounting plates when the unit is ready to be placed in service. This reduces packaging size and cost and also allows more units to be placed on a single pallet for shipping and storage.

The upper mounting member includes a clearance opening 26. This opening in the preferred embodiment is a round hole with a ⅜ inch diameter. This allows the person(s) installing the birdhouse to position a nail or a screw to the pole, tree or structure where the birdhouse is to be located. The birdhouse is then hung at the designated location where it can then be leveled, before permanent mounting screws or nails are put in place.

By determining the optimum location of the birdhouse prior to lifting the birdhouse into position, the installer does not have to hold or steady the birdhouse while leveling the birdhouse and installing the screws or nails.

The front wall of the birdhouse includes an entrance-hole 28 thru which a bird can enter and leave the birdhouse while building a nest on the floor of the birdhouse and raising young birds that are born in the birdhouse. The entrance-hole 28 is located under the over hanging roof and has a diameter which is suggested for the species of bird that the owner of the birdhouse wants to attract. Located below the entrance-hole 28 and above the hinged floor 21 on both the inside and outside is a ladder for young birds which consists of a number of angled horizontal grooves 30, and located above the floor 21 (see FIG. 2), is a tool-hole plate 32 having a tool-hole opening 34 which is provided for receiving a tool which is used when the birdhouse hinged floor 21 is to be opened by pulling down on the floor which disengages the magnetic catch. It is noted that opening the floor 21 works best if the tool-hole opening is on the side opposite the hinge (front wall) but it will work on a side wall. The further the tool-hole is away from the hinge the better it will work.

The walls, floor, roof and the mounting members can be made of wood, plywood, plastic, expanded plastic and/or composite materials where the various parts of the birdhouse are held together with appropriate fastening means such as screws, nails and/or an adhesive to provide a rigid weather tight birdhouse where typically the only movable part of the birdhouse may be the hinged floor. Of the various materials, expanded plastic with a skin on it will insulate well, look good and have a longer life than wood. Plastic is also cost effective for birdhouses being placed on public lands and plastic is easy to clean up.

Referring to FIG. 2 there is shown a sectional view taken along the line 2-2 of FIG. 1 showing the ladder of angled horizontal grooves on each side of the front wall of the birdhouse and magnetic catch 44 and strike plate 45 arrangement for securely holding the hinged floor 21 closed. The hinged floor includes an upper surface upon which a bird will build a nest, lay eggs, and feed young birds. The hinged floor also includes two side edges, a front end 38 and a rear end 40. The two side edges, the rear end and the front end of the hinged floor are surrounded by the side walls, the rear wall and the tool-hole plate. This construction prevents rain water that drips down the sides of the birdhouse from wetting the birdhouse floor. The rear end 40 of the floor 21 receives a pin (not shown) which passes thru a side wall of the birdhouse and is located in opening 42. Note, there are two pins, one on each side. This pin is the hinge pin for the floor. While the floor of the birdhouse pivots at the rear, it is understood that the floor can pivot in the front or on the side.

The hinge pins used can be 2 inch roofing nails. Holes were drilled in the two sides 12 and 14 slightly larger than the nail diameter. Two holes were also drilled in the floor 21. These holes 42 were smaller than the nail diameter. Thus when the birdhouse was assembled the nails slipped through the side walls but had an interference fit with the floor 21. Thus the floor holds the nails so they will not fall out and because there is a clearance in the two sides, the floor easily rotates when not restrained by the magnet.

Figure 3:
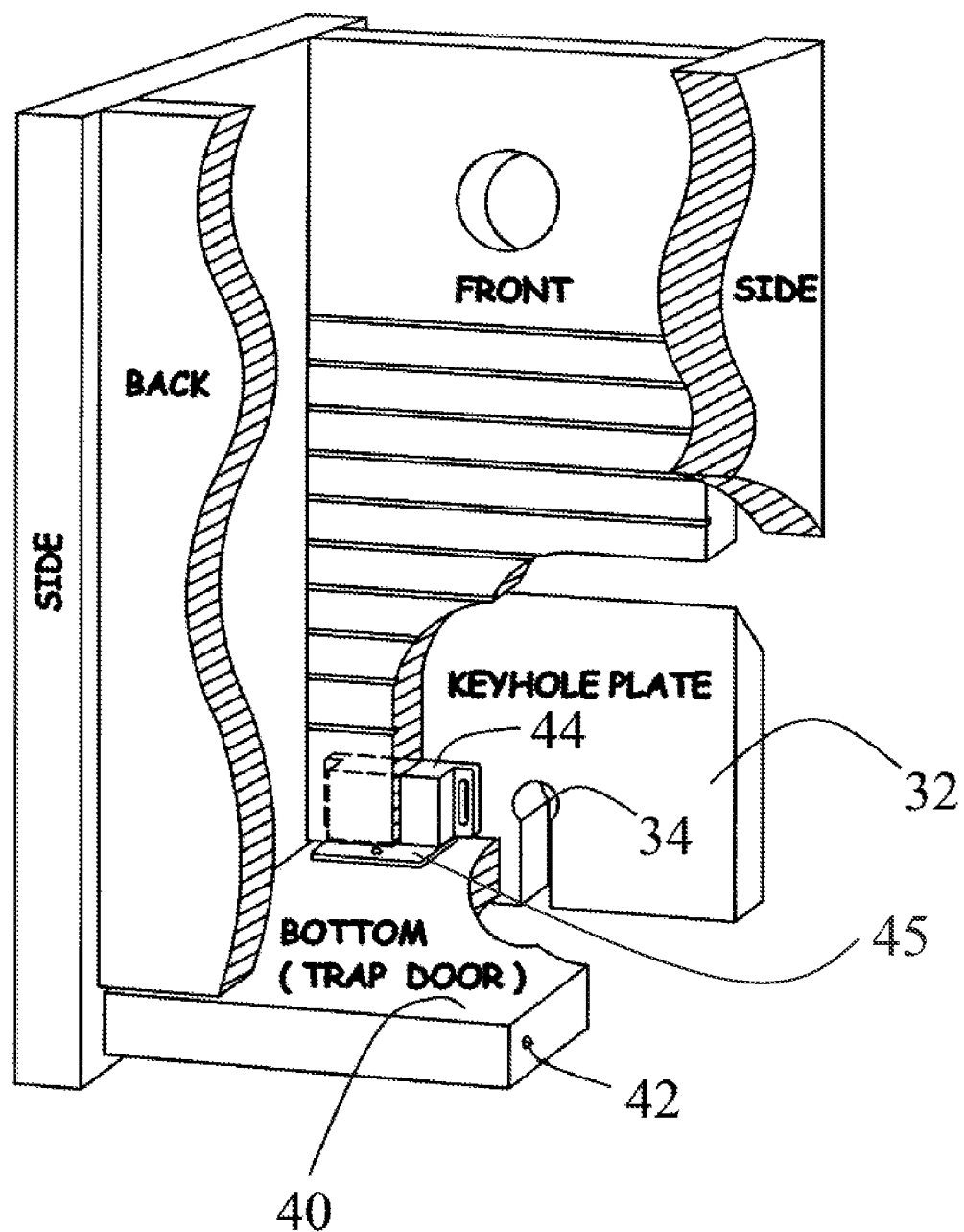
FIG. 3 is a fragmentary perspective enlarged view of the inside of the birdhouse showing the details of the magnetic catch, strike plate and tool-hole opening.

Referring now to FIG. 3, there is shown a fragmentary perspective enlarged view of the inside of the birdhouse showing the relationship of the hinged floor 21 with the magnetic catch 44, strike plate 45 and tool-hole opening. Located in a cutout in the front side of the front wall of the birdhouse and at one side of the tool-hole opening is a magnetic catch 44. Magnet 44 is preferably held in place by two self tapping pan head screws. The strike plate for the magnetic catch is located on the top surface of the hinged floor and is attached to the hinged floor preferably with a self tapping flat head screw. Thus, the only part of the magnetic catch 44 that is located in the interior of the birdhouse is a small section of the strike plate and a flat head screw.

The preferred magnetic catch is a low cost ceramic magnet with a single mounting hole in the middle which is sandwiched between two magnetic plates coated to resist rusting and is referred to as the yoke where each magnetic plate also has a single centrally located mounting hole. The three parts are held together as a unit with an ABS plastic housing having two mounting posts on the inside walls which engage the magnetic plates. The yoke, when in contact with the strike plate, which is a magnetic plate coated to resist rusting, is mounted on the top surface of the hinged floor creates a magnetic circuit that holds the hinged floor of the birdhouse closed. An advantage of the preferred magnetic catch is that the three pieces, the two magnetic plates and the magnet can slide relative to each other or as a system to accommodate misalignment with the strike plate. When the strike plate which is mounted to the top surface of the hinged floor contacts the yoke, the yoke will move, slide and align itself with the strike plate to provide a good magnetic circuit to hold the hinged floor in its closed position.

It is understood that, if desired, other types of catches can be substituted for the magnetic catch such as a ball catch, a touch catch, a one-quarter turn catch, a roller catch, etc., all of which are known to one who is familiar with catches.

Continuing with FIG. 3, the top surface of the hinged floor 21 when in the closed position and is being held closed by the magnetic catch is located below the top circular opening of the tool-hole opening 34. Thus, when a tool such as an end of a circular rod is inserted into the opening 34 above the top of the hinged floor 21, and is moved down in the slot of the tool-hole with sufficient force, the tool will cause the strike plate to be pulled free from the magnetic catch and will urge the hinged floor to swing open.

Figure 4:
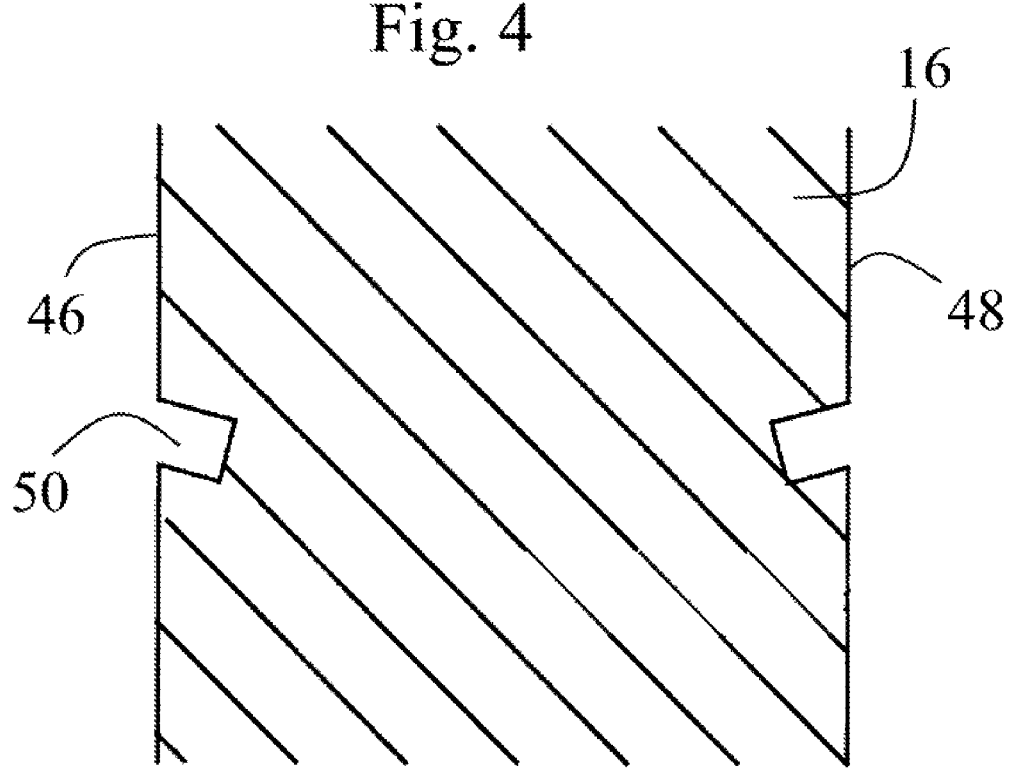
FIG. 4 is an enlarged partial side view of the front wall of the birdhouse showing the details of the ladder having horizontally positioned downwardly angled groove steps which are provided to allow a bird to walk up the inside and outside surface of the front wall of the birdhouse.

Referring to FIG. 4, there is shown an enlarged partial side view of the inside and outside surface of the front wall of the birdhouse showing the details of the ladder having horizontally positioned downwardly angled groove steps which are provided to allow a bird to walk up the inside and outside surfaces of the front wall of the birdhouse. These grooves are critical for little birds that are in deep birdhouses. In the birdhouse here disclosed the hinged floor on which a nest is built is located well below the entrance-hole 22 that is provided for a young bird to enter and leave the birdhouse. Therefore, a young bird born in the birdhouse and not yet able to fly must climb the inside surface of the front wall to leave the birdhouse thru the entrance-hole 22. To allow a young bird to reach the entrance-hole 22, a ladder having horizontally positioned downwardly angled groove steps are located on the inside surface of the front wall. Looking at FIG. 4, each groove 50 has a height of between one thirty second of an inch and three thirty seconds of an inch where one sixteenth of an inch more or less is preferred, a depth of between one thirty second of an inch and three thirty seconds of an inch where one sixteenth of an inch more or less is preferred, and is angled downwardly at an angle of between ten degrees and twenty degrees where an angle of fifteen degrees more or less is preferred. The horizontally positioned grooves are located on about one half inch centers more of less and there are about seven grooves, more or less, on the inside surface of the front wall where the upper most groove is located about nine sixteenth of an inch, more or less, below the bottom of the entrance-hole 22.

The outside surface of the front wall also has a ladder of horizontally positioned downwardly angled groove steps. Each groove 50 on the outside wall has a height of between one thirty second of an inch and three thirty seconds of an inch where one sixteenth of an inch more or less is preferred, a depth of between one thirty second of an inch and three thirty seconds of an inch where one sixteenth of an inch more or less is preferred, and is angled downwardly at an angle of between ten degrees and twenty degrees where an angle of fifteen degrees more or less is preferred. The horizontally positioned grooves are located on about one half inch centers more of less and there are about ten grooves, more or less, on the outside surface of the front wall where the upper most groove is located about nine sixteenth of an inch, more or less, below the bottom of the entrance-hole 22.

Birdhouses commonly are mounted at an elevated position above the ground either on a tree or on a mounting pole. In many instances the birdhouse is mounted at a considerable distance above the ground and, therefore is not accessible to a person standing on the ground. For instance, where it is desired to provide a birdhouse for Red-Headed Woodpeckers, the house should be located between 10 and 20 feet above the ground to attract the birds to the house.

Regardless of size or configuration, bird nesting structures must periodically be maintained and inspected. Old nests should be discarded. The structure must be cleansed of insects or other parasites that may accumulate in the decomposing organic matter forming the nest. Debris and bird droppings must be removed.

Since the birdhouse could be mounted at a considerable distance above ground to attract a desired species of bird, a convenient way to reach the birdhouse to remove last seasons nest and clean the birdhouse without bringing the birdhouse house down or climbing up on a ladder to reach the birdhouse is with a tool that is attached to a telescoping pole which is used to urge the hinged floor open.

Figure 5:
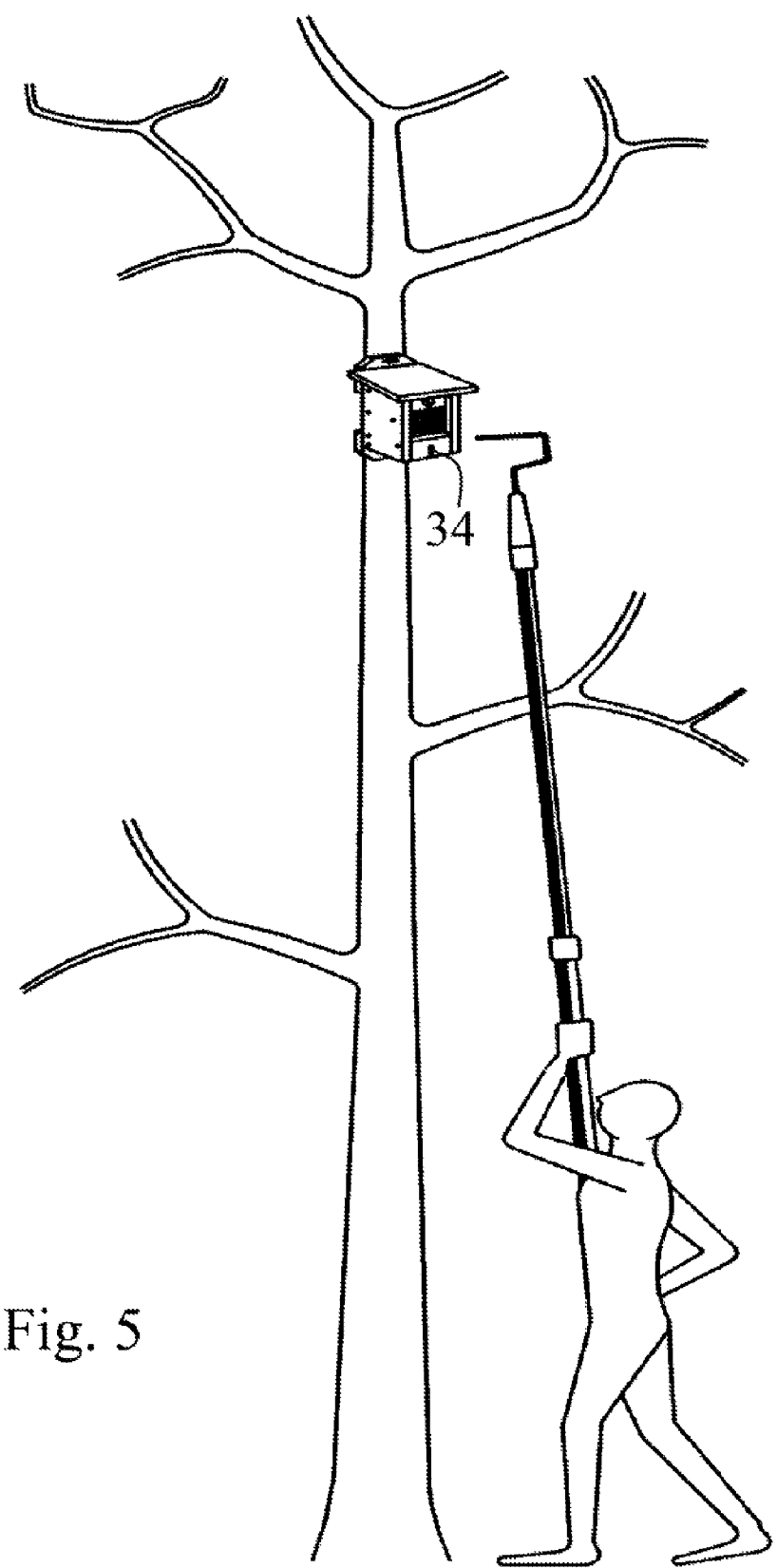
FIG. 5 is a view of a person using a tool attached to a telescoping pole to swing open the hinged floor of the birdhouse.

Referring to FIG. 5, there is shown a view of a person holding a telescoping pole attached to a tool such as a one eighth of an inch diameter rod or a one quarter of an inch diameter rod bent to have a horizontal end about to be inserted into the round opening of the tool-hole in the front wall of the birdhouse to swing open the hinged floor of the birdhouse. The telescoping pole can be a pole that a painter uses which has a male thread at one end that is threaded onto a hand held paint roller to paint ceilings. The telescoping pole can have a length which is adjustable from six feet to twelve feet or from eight feet to sixteen feet. The tool can be the hand paint roller which has female threads located in the end of the handle which threads onto the threaded end of the painter's telescoping pole where the rotatable fabric covered paint roller has been removed form the horizontally oriented wire support shaft. Thus, the tool can be a hand held paint roller without the roller.

In addition, to clean the birdhouse once the floor is dropped, a spray bottle designed with a thread on the bottom can be mounted to the extension pole and a lanyard can be pulled to spray a bleach solution to disinfect the nesting site. Other specialty tools such as a brush can be quickly attached and removed to complete the cleaning task.

Figure 6:
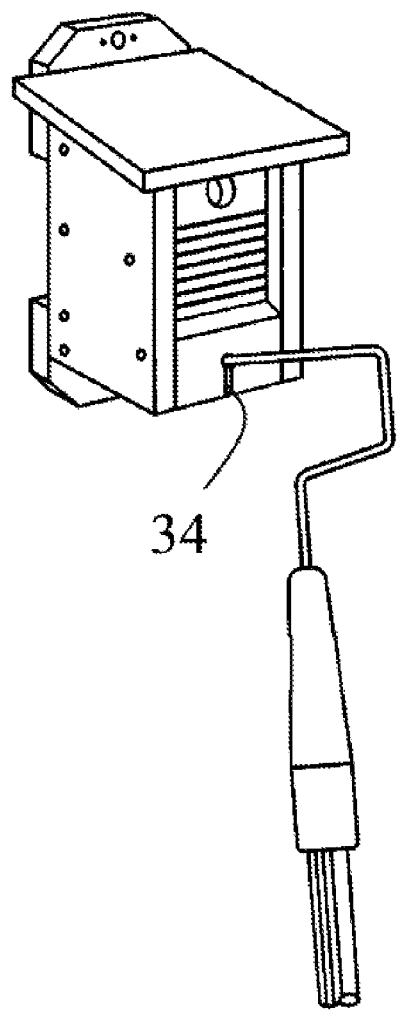
FIG. 6 shows the tool being inserted into the tool-hole opening in the front wall of the birdhouse.
Figure 7:
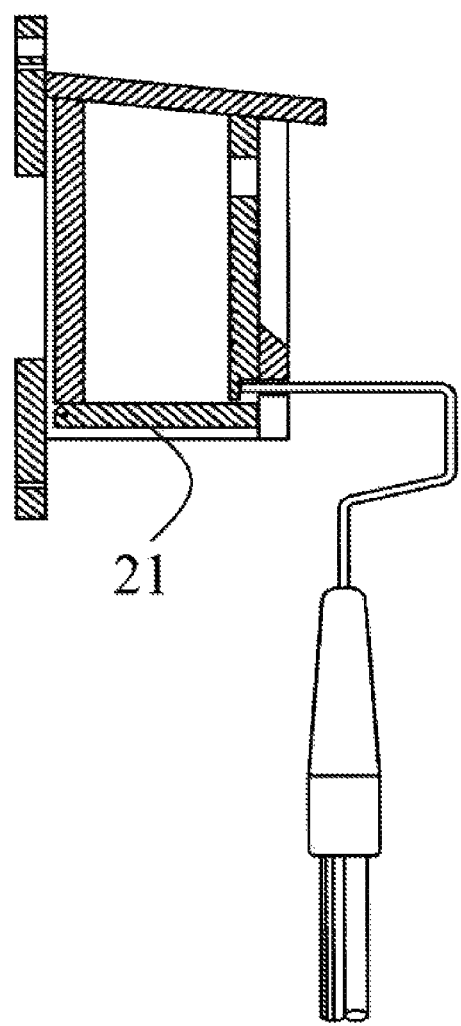
FIG. 7 is a sectional view showing the tool in the tool-hole opening of the birdhouse just prior to being pulled down to swing open the hinged floor.
Figure 8:
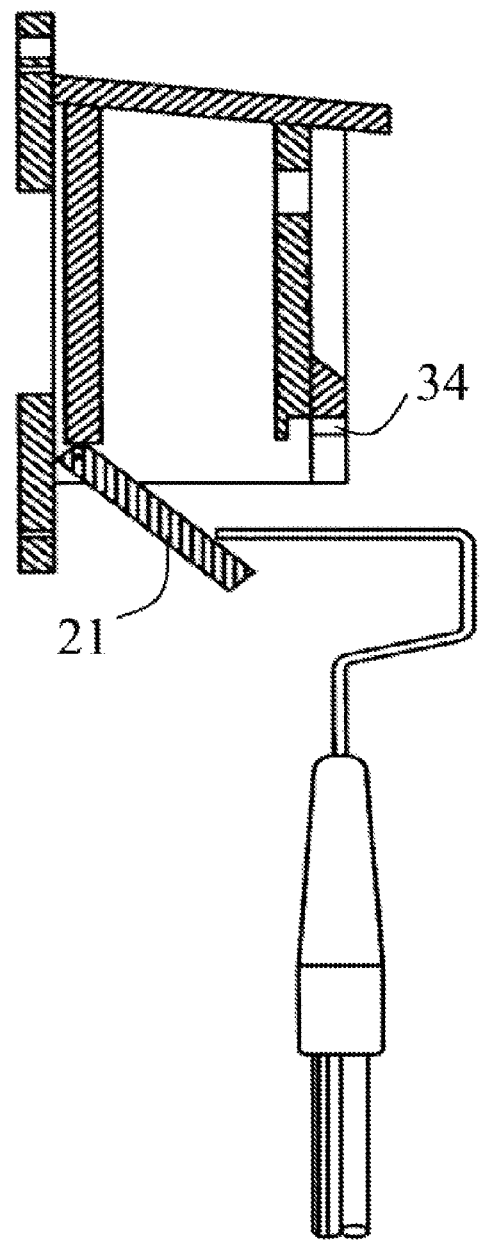
FIG. 8 is a sectional view showing the tool pulling down and opening the hinged floor.
Figure 9:
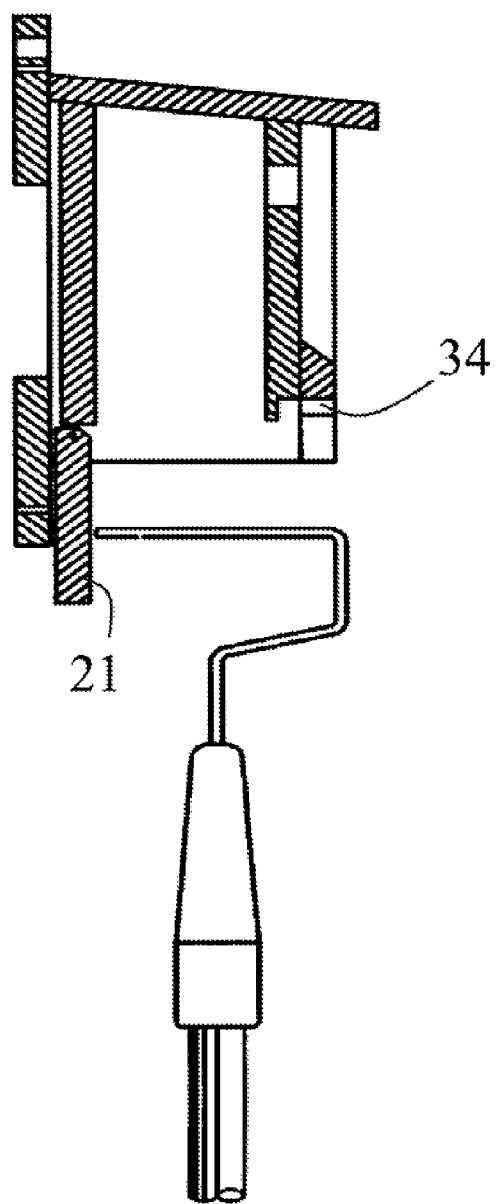
FIG. 9 is a sectional view showing the hinged floor being pushed to its fully open position by the tool.

FIG. 6 shows the tool being inserted into the tool-hole opening in the front of the birdhouse. FIG. 7 is a sectional view of the birdhouse showing the tool in the tool-hole opening and above the hinged floor of the birdhouse just prior to being pulled down to swing open the hinged floor. FIG. 8 is a sectional view of the birdhouse showing the tool pulling down and opening the hinged floor. FIG. 9 is a sectional view of the birdhouse showing the hinged floor being pushed to its fully open position by the tool. At this time any remaining part of the nest that is still in the birdhouse can be removed using the bent wire tool or the brush attachment. Also when desirable the birdhouse can be disinfected. All of these tasks can be accomplished in a birdhouse that is high above the ground without climbing a ladder or removing the birdhouse.

In the case of migratory birds, the open hinged floor of the birdhouse in the open position restricts use by other species bird until it is closed just before the arrival of the desired species. When the birdhouse is ready for use, the hinged floor can be closed by hand for birdhouse which are located at elevations within easy reach such as a bluebird house were the floor is often located five feet above ground. The hinged floor can also be closed or pushed shut using the wire tool at the end of the telescoping pole.

While there have been shown and described and pointed out the fundamental novel features of the invention as applied to the preferred embodiments, it will be understood that the foregoing is considered as illustrative only of the principles of the invention and not intended to be exhaustive or to limit the invention to the precise forms disclosed. Obvious modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are entitled.

What is claimed is:

1. A birdhouse which having been mounted at or above a person's reach can be cleaned without removing a part of the birdhouse, climbing a ladder or lowering the birdhouse to the ground comprising:
    a housing defining a bird nesting enclosure including a roof and a plurality of walls one of which is a front wall, said housing including an open entrance-hole located in the front wall for a bird to enter and leave said enclosure;
    a hinged floor having a top surface, a bottom surface, a rear end and a front end coupled to pivot about its rear end where the front end adjoins the inside surface of the front wall and the bottom surface of the hinged floor is located below the top of the tool-hole opening in the front wall;
    a tool-hole opening which extends from an outside surface to a surface within a wall is located above the bottom surface of the hinged floor, said tool-hose opening is provided for receiving a tool which can urge the hinged floor to swing open from a nominally horizontal position to a nominally vertical position.

2. The birdhouse of claim 1 wherein a catch which is attached to a wall of the housing magnetically, mechanically or frictionally engages a holding member attached to the top surface of the hinged floor to hold the hinged floor closed.

3. The birdhouse of claim 2 wherein the catch and holding member is a magnetic catch and strike plate.

4. The birdhouse of claim 2 wherein the catch and holding member is a ball catch.

5. The birdhouse of claim 2 wherein the catch and holding member is a touch catch.

* * * * *